(12) United States Patent
Chen et al.

(10) Patent No.: US 7,547,141 B2
(45) Date of Patent: Jun. 16, 2009

(54) LINEAR MOTION GUIDE APPARATUS HAVING DETECTING DEVICE

(75) Inventors: Hsing Liang Chen, Taichung (TW); Hsin Tsun Hsu, Taichung (TW)

(73) Assignee: Hiwin Technologies Corp., Situn Taichung (TW)

( * ) Notice: Subject to any disclaimer, the term of this patent is extended or adjusted under 35 U.S.C. 154(b) by 358 days.

(21) Appl. No.: 11/584,915

(22) Filed: Oct. 23, 2006

(65) Prior Publication Data

US 2008/0095479 A1    Apr. 24, 2008

(51) Int. Cl.
*F16C 29/06* (2006.01)

(52) U.S. Cl. ............................ 384/8; 384/45
(58) Field of Classification Search ...................... 348/8, 348/9, 43–45, 448; 324/207.24

See application file for complete search history.

(56) References Cited

U.S. PATENT DOCUMENTS

| | | | | |
|---|---|---|---|---|
| 5,476,324 | A | * | 12/1995 | Takei ............................ 384/8 |
| 5,779,367 | A | * | 7/1998 | Obara ........................... 384/8 |
| 5,945,824 | A | * | 8/1999 | Obara et al. ............ 324/207.24 |
| 6,333,628 | B1 | | 12/2001 | Yeh et al. ............... 324/207.24 |
| 7,178,981 | B2 | * | 2/2007 | Rudy ............................ 384/8 |
| 7,456,526 | B2 | * | 11/2008 | Teramachi et al. ............ 310/12 |

\* cited by examiner

*Primary Examiner*—Thomas R Hannon
(74) *Attorney, Agent, or Firm*—Charles E. Baxley

(57) ABSTRACT

A linear motion guide device includes a magnetic member disposed on a guide rail, a slider slidably attached onto the guide rail for moving along the guide rail, and a detecting device includes a housing detachably secured to the slider and has a chamber for receiving a detecting member, and a casing detachably coupled to the housing for retaining the detecting member in the housing. The detecting device may be easily and readily attached to the linear motion guide device without changing the arrangement of the linear motion guide device. Other casings may be changeably coupled to the housing of different structure.

14 Claims, 6 Drawing Sheets

LINEAR MOTION GUIDE APPARATUS HAVING DETECTING DEVICE

BACKGROUND OF THE INVENTION

1. Field of the Invention

The present invention relates to a linear motion guide apparatus, and more particularly to a linear motion guide apparatus including a detecting device designed and arranged to be easily and readily attached to the linear motion guide apparatus without changing the configuration and the arrangement of the linear motion guide apparatus.

2. Description of the Prior Art

Typical linear motion guide devices comprise a slider or slide block slidably attached onto a guide rail, and normally, a ball bearing device disposed between the slider and the guide rail for facilitating the sliding movement between the slider and the guide rail and for allowing the slider and the guide rail to be smoothly moved relative to each other.

For example, U.S. Pat. No. 6,333,628 to Yeh et al. discloses one of the typical linear motion rolling guide units also comprising a slider or slide block slidably attached onto a guide rail, a magnetic tape attached onto the guide rail, and a magnetic detection device or sensor attached to the slide block for acting with the magnetic tape of the guide rail and for detecting the relative distance between the slide block and the guide rail.

In the typical linear motion rolling guide units, a specially designed end cap is required to be designed and provided for receiving a magnetic induction element therein and for being secured to the slide block and sandwiched between the slide block and a wiper.

However, in different typical linear motion rolling guide units, when the arrangements and/or the sizes or the distances between the slide blocks and the guide rails are different from each other, the magnetic detection device or sensor may no longer be attached to the slide block and another magnetic detection device or sensor should be designed and provided for securing to the slide blocks that include different arrangements and/or the sizes or the distances between the slide blocks and the guide rails.

The present invention has arisen to mitigate and/or obviate the afore-described disadvantages of the conventional linear motion guide devices.

SUMMARY OF THE INVENTION

The primary objective of the present invention is to provide a linear motion guide apparatus including a detecting device designed and arranged to be easily and readily attached to the linear motion guide apparatus without changing the configuration and the arrangement of the linear motion guide apparatus.

In accordance with one aspect of the invention, there is provided a linear motion guide apparatus comprising a guide rail, a magnetic member disposed on the guide rail, a slider slidably attached onto the guide rail for moving along the guide rail, and a detecting device including a housing detachably secured to the slider and having a chamber formed therein, a detecting member received in the chamber of the housing, and a casing detachably coupled to the housing for retaining the detecting member in the chamber of the housing.

The casing includes two tracks provided thereon and a slot formed between the tracks of the casing for engaging with the detecting member. The tracks of the casing each include a shoulder formed therein, and the housing includes a channel formed therein for defining two flanges, the flanges of the housing are slidably engaged with the shoulders of the tracks for slidably and detachably securing the casing to the housing.

For example, the flanges of the housing each include a shoulder formed therein for slidably engaging with the tracks of the casing.

The casing includes an end panel for engaging onto the housing and for anchoring the end panel of the casing to the housing. The casing includes a frame extended from the end panel for engaging into the chamber of the housing and for positioning the end panel of the casing to the housing.

The housing includes a conduit formed therein, the detecting member includes a signal segment extended therefrom and received and engaged in the conduit of the housing. The housing includes a passage formed therein and located between the conduit and the chamber of the housing and communicating with the conduit and the chamber of the housing, the detecting member includes an extension located between the detecting plate and the signal segment and engaged in the passage of the housing. The detecting member includes a shield engaged onto the signal segment for shielding and protecting the signal segment.

The slider includes a wiper attached thereto, the housing is attached to the slider. The wiper includes a recess formed therein, the housing includes an end wall engaged in the recess of the wiper. The end wall of the housing includes an aperture formed therein, and a fastener engaged through the aperture of the housing for securing the housing to the wiper of the slider.

The slider includes an end cap attached thereto and engaged with the wiper, the end cap includes a screw hole formed therein for engaging with the fastener, the wiper includes an orifice formed therein and aligned with the screw hole of the end cap for receiving the fastener. The housing includes an outer peripheral shoulder formed in an outer peripheral portion of the end wall for allowing the end wall of the housing to be snugly fitted into the recess of the wiper.

The detecting device includes a second casing changeably coupled to the housing. The second casing includes a thickness different from that of the casing. The second casing includes two tracks provided on a base panel, and a slot formed between the tracks of the second casing for engaging with the detecting member, and a groove formed in the base panel of the second casing and communicating with the slot of the second casing.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
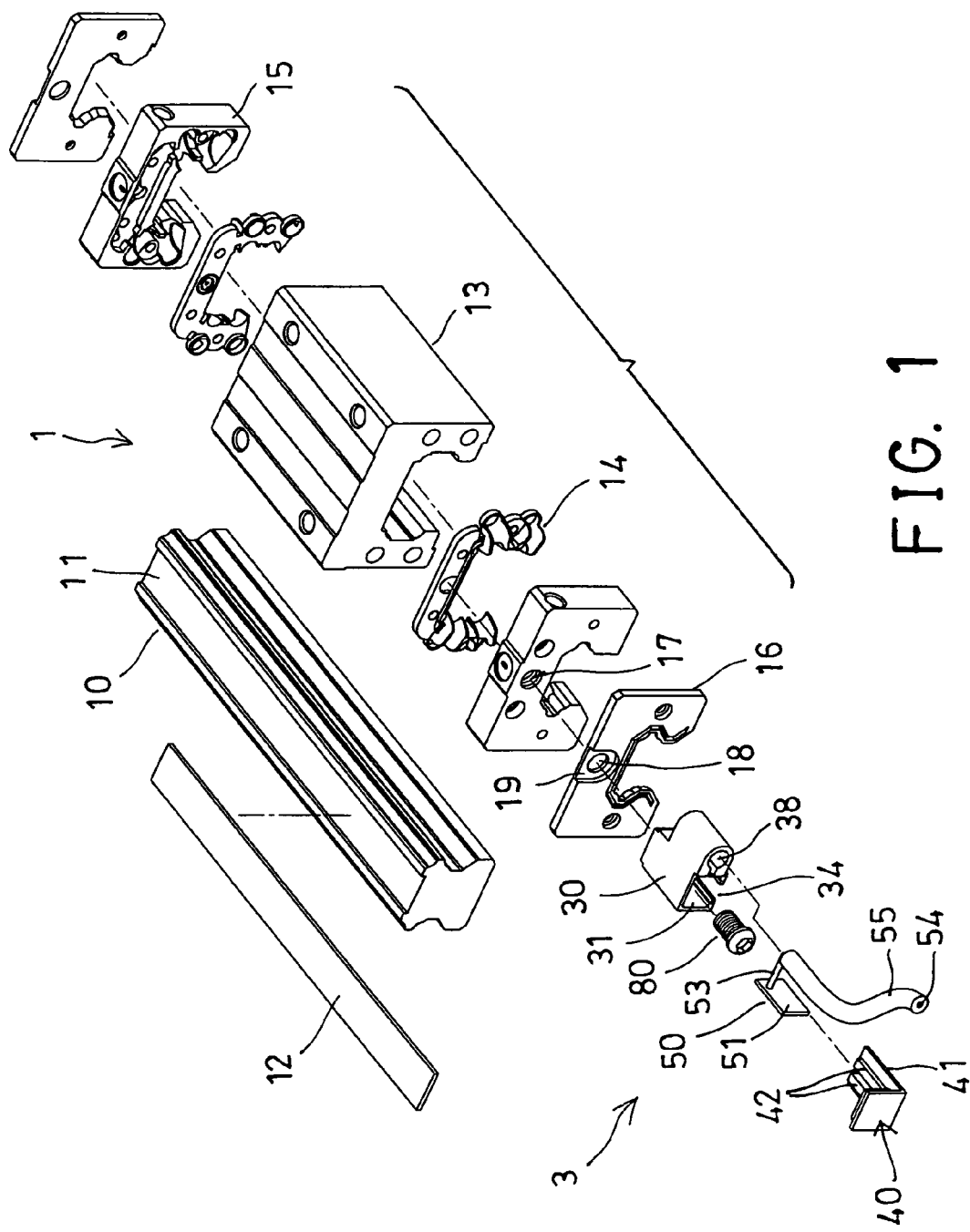
FIG. 1 is a partial exploded view of a linear motion guide apparatus in accordance with the present invention.
Figure 2:
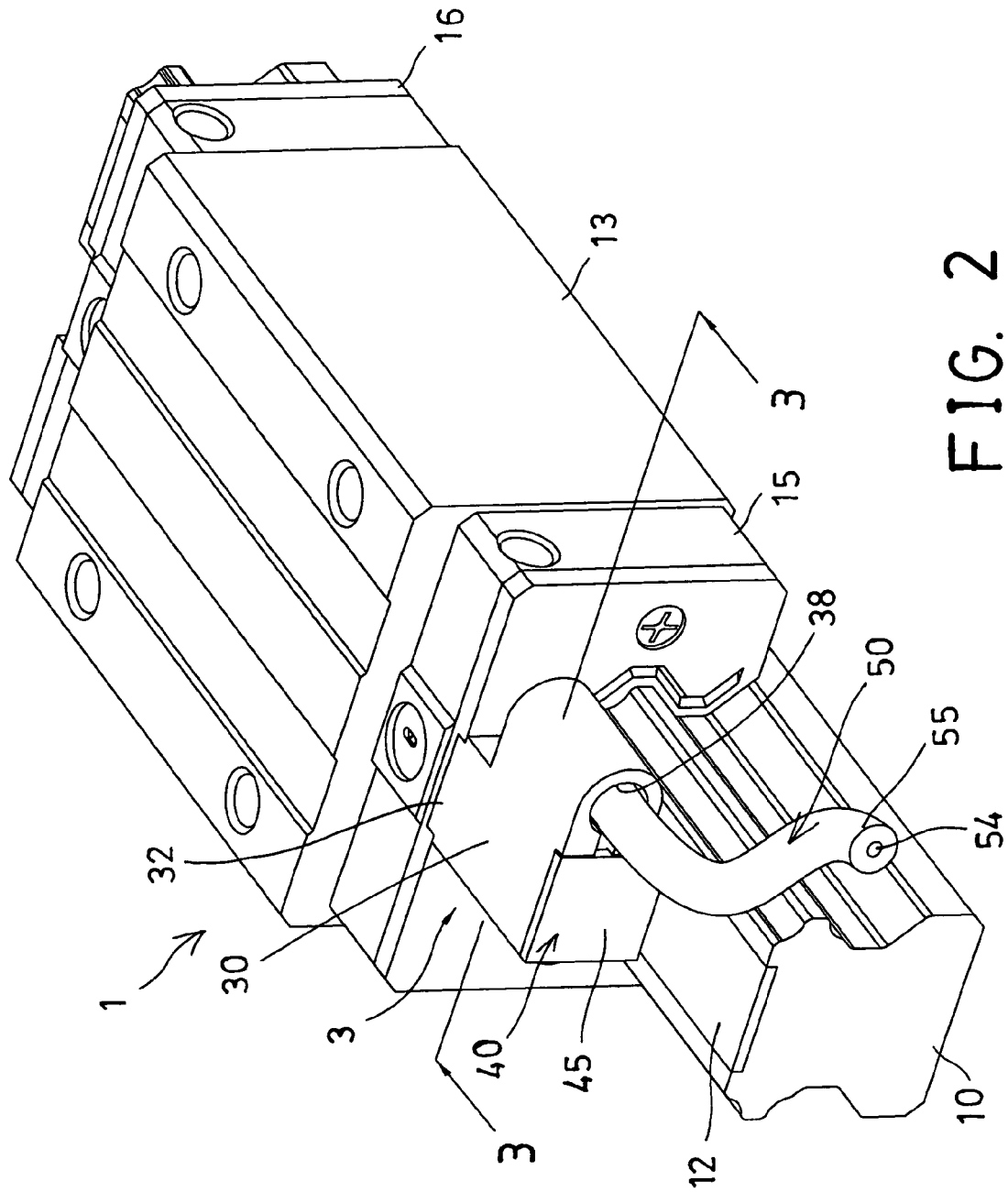
FIG. 2 is a perspective view of the linear motion guide apparatus.
Figure 3:
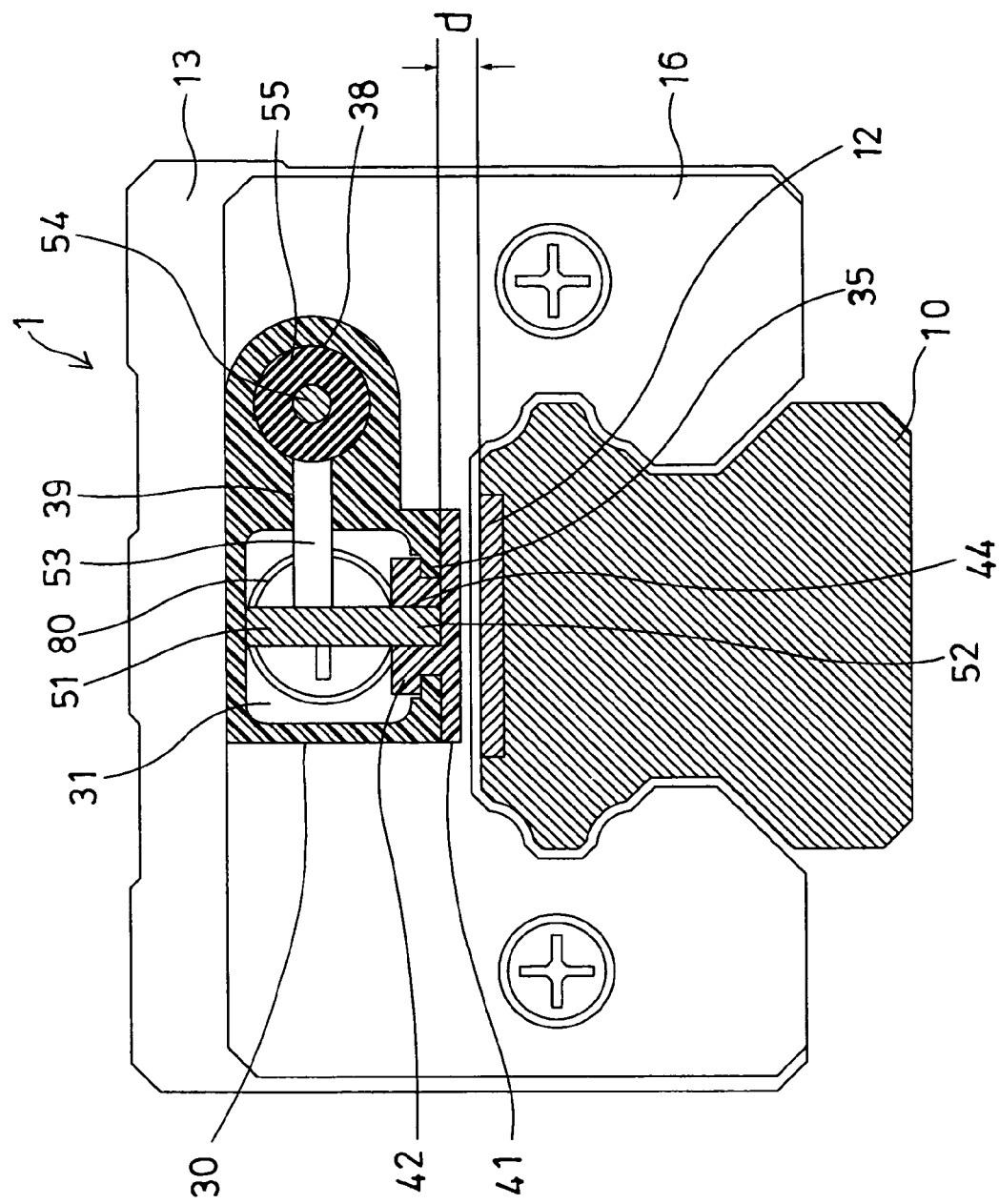
FIG. 3 is a cross sectional view of the linear motion guide apparatus taken along lines 3-3 of FIG. 2.
Figure 4:
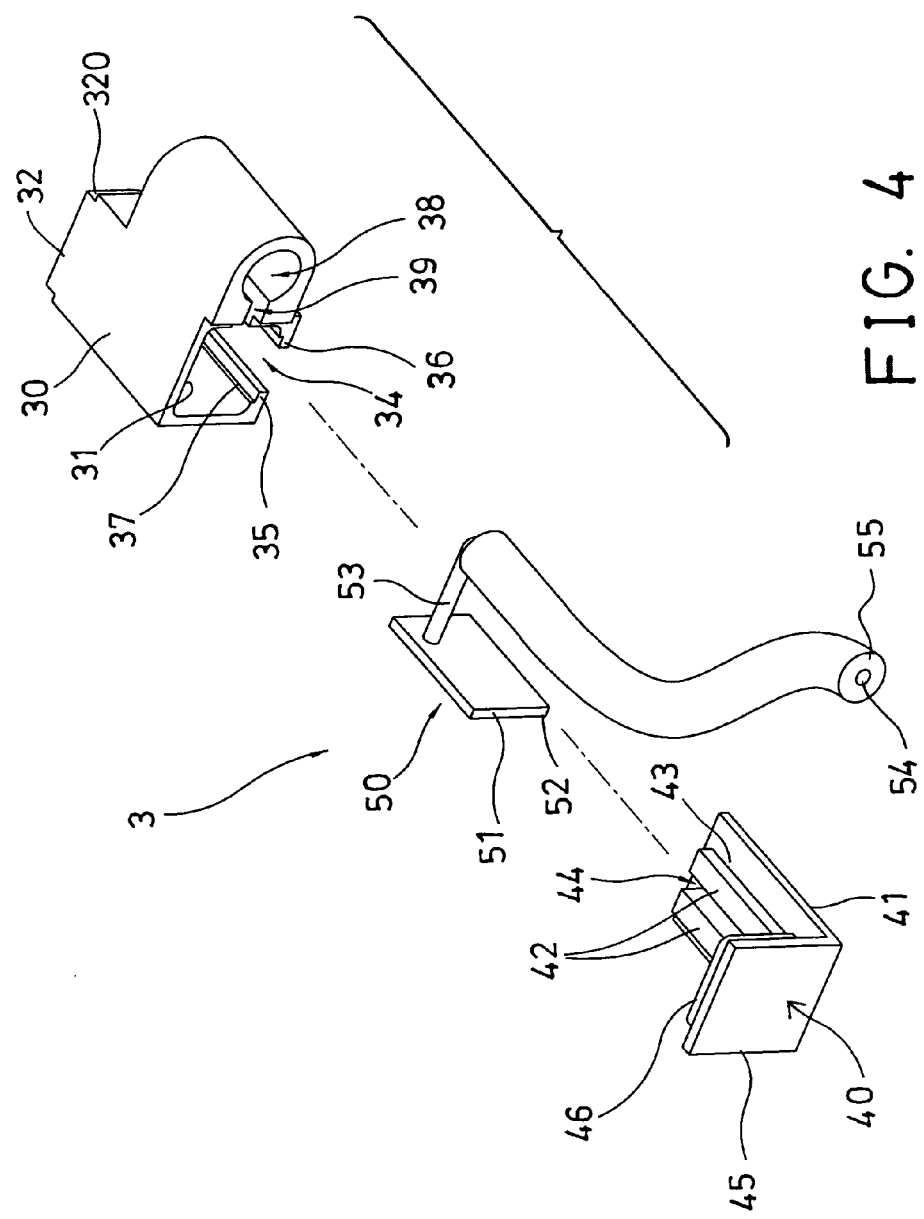
FIG. 4 is a partial exploded view illustrating a detecting device for the linear motion guide apparatus.
Figure 5:
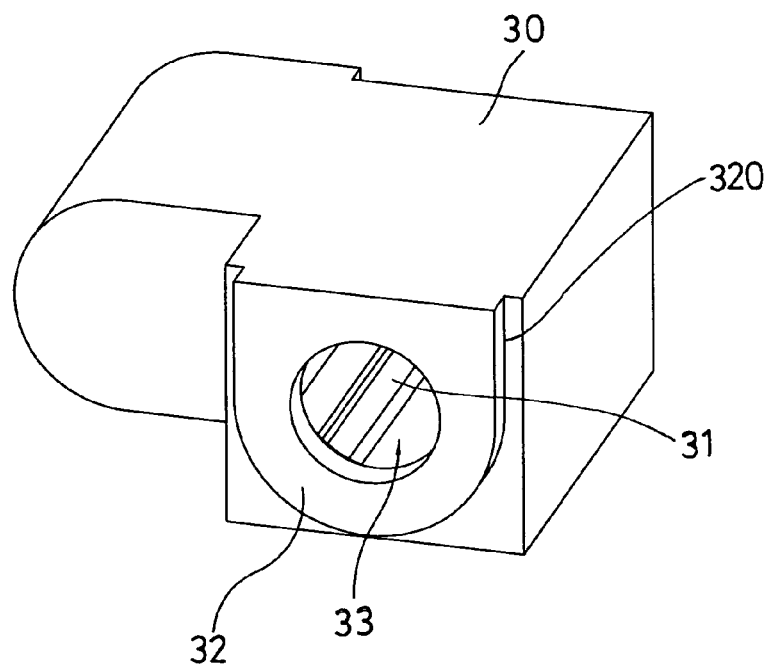
FIG. 5 is a rear perspective view illustrating a housing of the detecting device for the linear motion guide apparatus.
Figure 6:
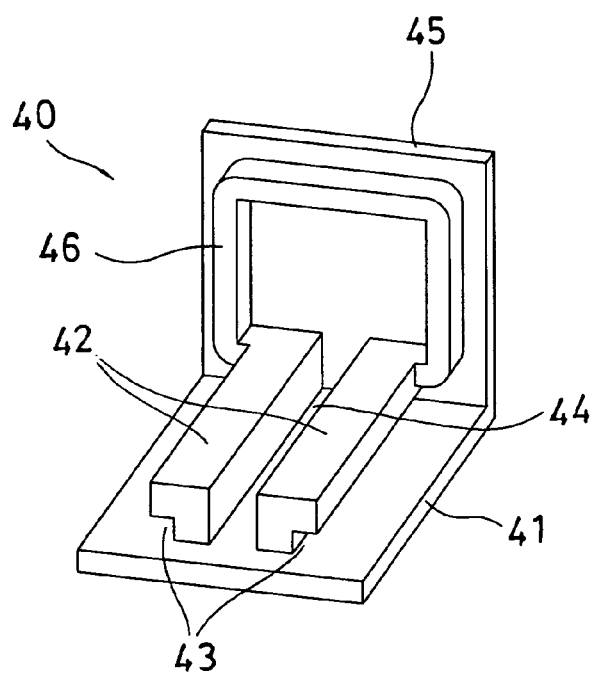
FIG. 6 is a rear perspective view illustrating a casing of the detecting device for the linear motion guide apparatus.

Referring to the drawings, and initially to FIGS. 1-3, a linear motion guide apparatus 1 in accordance with the present invention comprises a guide rail 10 including a longitudinal depression 11 formed in the upper portion thereof for receiving or attaching a longitudinal magnetic tape or member 12 therein, and a slide block or a slider 13 slidably attached onto the guide rail 10 and arranged to be moved along the guide rail 10, and normally, a ball bearing device (not shown) disposed between the slider 13 and the guide rail 10 for facilitating the sliding movement between the slider 13 and the guide rail 10 and for allowing the slider 13 and the guide rail 10 to be smoothly moved relative to each other. It is preferable, but not necessarily, that the longitudinal magnetic member 12 extends along the length of the guide rail 10.

The linear motion guide apparatus 1 further includes two spacers 14 disposed on the two sides or end portions or outer portions of the slider 13, two end caps 15 disposed on the outer portions of the spacers 14 respectively, and two dust caps or wipers 16 disposed on the outer portions of the end caps 15 and engaged with the end caps 15 respectively. The ball bearing device (not shown) and the spacers 14 and the end caps 15 and the dust caps or wipers 16 are not related to the present invention and will not be described in further details. One of the end caps 15 includes a screw hole 17 formed therein (FIG. 1), and one of the wipers 16 includes an orifice 18 formed therein (FIG. 1) and aligned with the screw hole 17 of the end cap 15 for receiving a fastener 80 which may be threaded or engaged with the screw hole 17 of the end cap 15. It is preferable that the wiper 16 further includes a recess 19 formed therein (FIG. 1) and communicating with the orifice 18 of the wiper 16.

A distance or location detecting device 3 is further provided and arranged to be attached to the slider 13 for acting with the magnetic member 12 of the guide rail 10 and for detecting the relative distance between the slider 13 and the guide rail 10. As shown in FIGS. 1-6, the detecting device 3 includes a housing 30 having a chamber 31 formed therein and defined by an end wall 32 which includes a non-circular cross section for engaging into the corresponding non-circular recess 19 of the wiper 16 and for stably anchoring or positioning the housing 30 to the wiper 16 and for preventing the housing 30 from being moved downwardly and laterally or sidewise relative to the wiper 16. The housing 30 includes an aperture 33 formed in the end wall 32 (FIG. 5) for receiving the fastener 80 and for stably securing or fastening the housing 30 to the wiper 16 or to the slider 13.

It is preferable that the housing 30 further includes an outer peripheral shoulder 320 formed in the outer peripheral portion of the end wall 32 (FIGS. 4, 5) and arranged for allowing the end wall 32 of the housing 30 to be snugly fitted into the recess 19 of the wiper 16 and for further stably anchoring or positioning the housing 30 to the wiper 16. The housing 30 includes a channel 34 formed in the lower portion thereof and communicating with the chamber 31 of the housing 30 for forming or defining two flanges 35, 36, and includes a longitudinal shoulder 37 formed in each of the flanges 35, 36, and further includes a conduit 38 formed in the side portion of the housing 30, and includes a passage 39 formed in the housing 30 and located between the conduit 38 and the chamber 31 of the housing 30 and for communicating the conduit 38 and the chamber 31 of the housing 30 with each other.

The detecting device 3 further includes a cover or casing 40 having a base panel 41 for engaging onto the bottom portion of the housing 30 (FIGS. 3, 7), and includes one or more (such as two) tracks 42 formed or provided or extended upwardly from the base panel 41 for engaging with the longitudinal shoulders 37 of the housing 30, and the tracks 42 of the casing 40 each include a longitudinal shoulder 43 formed therein for engaging with or for slidably receiving the corresponding flanges 35, 36 of the housing 30 and thus for slidably and detachably securing or coupling the casing 40 to the housing 30. The casing 40 includes a slot 44 formed and located between the tracks 42 of the casing 40, and includes an end panel 45 for engaging onto the outer peripheral portion of the housing 30 (FIG. 2) and for stably anchoring or positioning the end panel 45 of the casing 40 to the housing 30.

It is preferable that the casing 40 further includes a peripheral frame 46 extended from the end panel 45 for engaging into the chamber 31 of the housing 30 and for further stably anchoring or positioning the end panel 45 of the casing 40 to the housing 30. It is further preferable that the peripheral frame 46 of the end panel 45 of the casing 40 is engaged with the housing 30 with such as a force-fitted engagement for stably anchoring or positioning the casing 40 to the housing 30 and for selectively enclosing or blocking the chamber 31 of the housing 30 and/or for detachably securing or coupling the casing 40 to the housing 30 and for stably receiving or supporting or retaining a detecting member 50 in the chamber 31 of the housing 30.

The detecting member 50 of the detecting device 3 includes a sensing or inductive or detecting plate 51 having a lower portion 52 disposed in the slot 44 or engaged between the tracks 42 of the casing 40 (FIGS. 3, 7) for stably retaining or positioning the detecting plate 51 of the detecting member 50 in the chamber 31 of the housing 30, and includes an extension 53 laterally extended from the detecting plate 51 and received or engaged in the passage 39 of the housing 30, and includes a signal segment 54 extended from the extension 53 for signal emitting and/or receiving purposes, and includes an insulating cover or shield 55 engaged onto the outer peripheral portion of the signal segment 54 for shielding and protecting the signal segment 54. The extension 53 is extended or located between the detecting plate 51 and the signal segment 54, and the signal segment 54 is received or engaged in the conduit 38 of the housing 30.

In operation, as shown in FIG. 3, the detecting plate 51 of the detecting member 50 may be stably retained or positioned in the chamber 31 of the housing 30, and the housing 30 may be stably or solidly secured to the wiper 16 and the end cap 15 and the slider 13 for allowing the detecting plate 51 of the detecting member 50 to be stably guided and moved relative to the longitudinal magnetic member 12 and the guide rail 10 and to be acted with the longitudinal magnetic member 12 in order to sense or to detect or to measure the relative sliding movement between the slider 13 and the guide rail 10 and to emit the detected signal out through the signal segment 54, for example.

Figure 7:
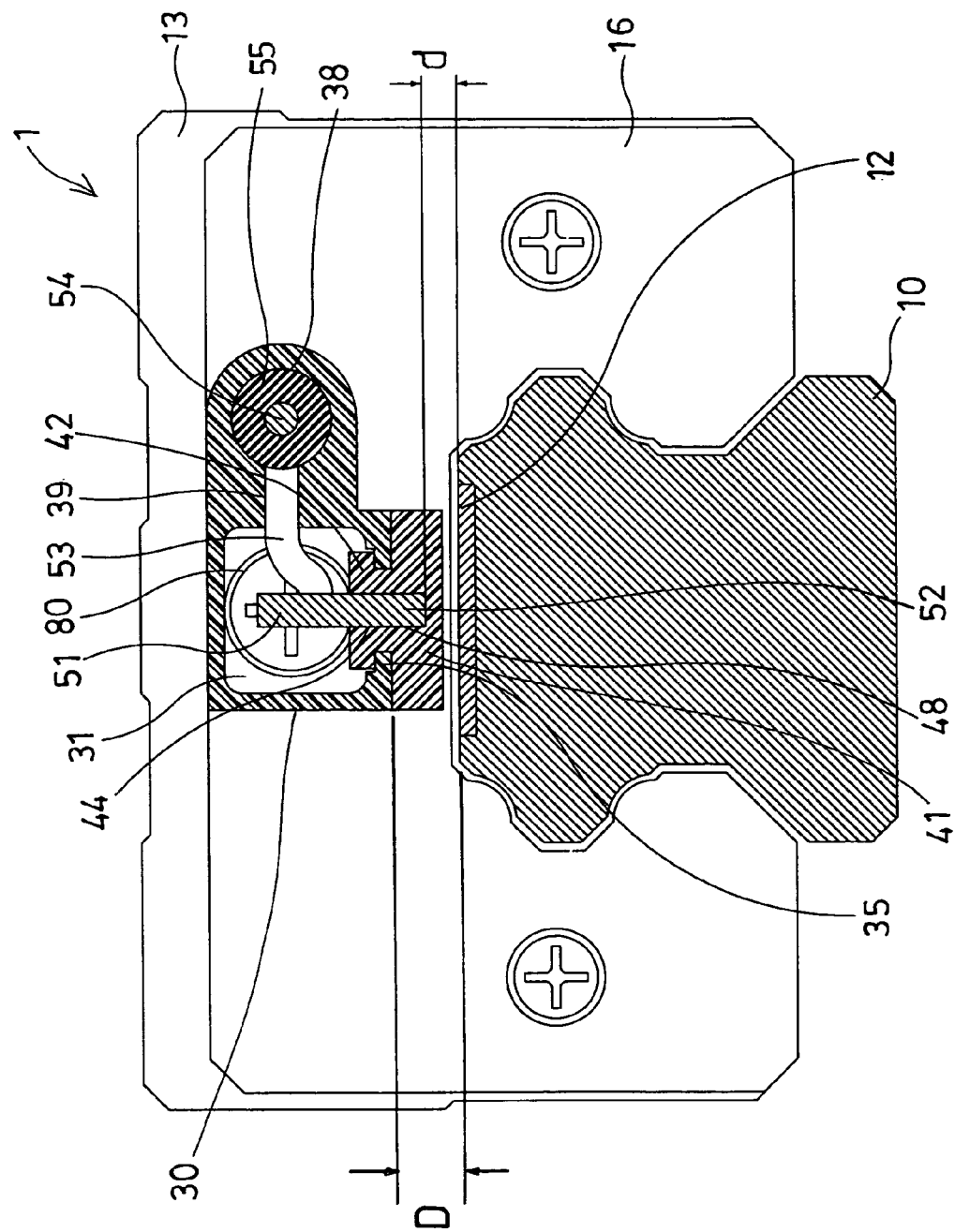
FIG. 7 is a cross sectional view similar to FIG. 3, illustrating the other arrangement of the linear motion guide apparatus.

It is to be noted that the assembled detecting device 3 including the housing 30 and the casing 40 and the detecting member 50 may be easily and quickly and readily attached or coupled or secured to the wiper 16 and/or the end cap 15 and/or the slider 13 without changing the configuration and the arrangement of the linear motion guide apparatus 1 such that detecting device 3 may be easily and quickly and readily attached or coupled or secured to various or different linear motion guide apparatuses 1 of different arrangement or structure. For example, as shown in FIG. 7, the distance "D" between the bottom portion of the housing 30 and the upper portion of the guide rail 10 or the magnetic member 12 of the other linear motion guide apparatus 1 may either be greater or smaller or different from that of the linear motion guide apparatus 1 as shown in FIG. 3.

In this situation, the detecting device 3 may include another or a second casing 40 having a base panel 41 of greater or smaller or different thickness and having a groove 48 formed in the base panel 41 and communicating with the slot 44 of the casing 40 for receiving the lower portion 52 of the detecting plate 51 of the detecting member 50 and for allowing the distance "d" between the bottom or lower portion 52 of the detecting plate 51 and the longitudinal magnetic member 12 of the guide rail 10 to be maintained as small as possible, or to be maintained the same as the distance "d" between the detecting plate 51 and the longitudinal magnetic member 12 of that shown in FIG. 3, such that the various or different detecting devices 3 may be easily and readily attached to the other linear motion guide apparatus 1 with different casings 40 in order to maintain the distance "d" between the detecting plate 51 and the longitudinal magnetic member 12 as small as possible.

Accordingly, the linear motion guide apparatus in accordance with the present invention includes a detecting device designed and arranged to be easily and readily attached to the linear motion guide apparatus without changing the configuration and the arrangement of the linear motion guide apparatus.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

We claim:

1. A linear motion guide apparatus comprising:
   a guide rail,
   a magnetic member disposed on said guide rail,
   a slider slidably attached onto said guide rail for moving along said guide rail, and
   a detecting device including a housing detachably secured to said slider and having a chamber formed therein, a detecting member received in said chamber of said housing, and a casing detachably coupled to said housing for retaining said detecting member in said chamber of said housing.

2. The linear motion guide apparatus as claimed in claim 1, wherein said casing includes two tracks provided thereon and a slot formed between said tracks of said casing for engaging with said detecting member.

3. The linear motion guide apparatus as claimed in claim 2, wherein said tracks of said casing each include a shoulder formed therein, and said housing includes a channel formed therein for defining two flanges, said flanges of said housing are slidably engaged with said shoulders of said tracks for slidably and detachably securing said casing to said housing.

4. The linear motion guide apparatus as claimed in claim 3, wherein said flanges of said housing each include a shoulder formed therein for slidably engaging with said tracks of said casing.

5. The linear motion guide apparatus as claimed in claim 1, wherein said casing includes an end panel for engaging onto said housing and for anchoring said end panel of said casing to said housing.

6. The linear motion guide apparatus as claimed in claim 5, wherein said casing includes a frame extended from said end panel for engaging into said chamber of said housing and for positioning said end panel of said casing to said housing.

7. The linear motion guide apparatus as claimed in claim 1, wherein said housing includes a conduit formed therein, said detecting member includes a signal segment extended therefrom and received and engaged in said conduit of said housing.

8. The linear motion guide apparatus as claimed in claim 7, wherein said housing includes a passage formed therein and located between said conduit and said chamber of said housing and communicating with said conduit and said chamber of said housing, said detecting member includes an extension located between said detecting plate and said signal segment and engaged in said passage of said housing.

9. The linear motion guide apparatus as claimed in claim 7, wherein said detecting member includes a shield engaged onto said signal segment for shielding and protecting said signal segment.

10. The linear motion guide apparatus as claimed in claim 1, wherein said slider includes a wiper attached thereto, said housing is attached to said wiper.

11. The linear motion guide apparatus as claimed in claim 10, wherein said wiper includes a recess formed therein, said housing includes an end wall engaged in said recess of said wiper.

12. The linear motion guide apparatus as claimed in claim 11, wherein said end wall of said housing includes an aperture formed therein, and a fastener engaged through said aperture of said housing for securing said housing to said wiper of said slider.

13. The linear motion guide apparatus as claimed in claim 12, wherein said slider includes an end cap attached thereto and engaged with said wiper, said end cap includes a screw hole formed therein for engaging with said fastener, said wiper includes an orifice formed therein and aligned with said screw hole of said end cap for receiving said fastener.

14. The linear motion guide apparatus as claimed in claim 11, wherein said housing includes an outer peripheral shoulder formed in an outer peripheral portion of said end wall for allowing said end wall of said housing to be snugly fitted into said recess of said wiper.

* * * * *